INVENTORS
MICHAEL L. DERTOUZOS
HUBER L. GRAHAM

BY Robert F. O'Connell
ATTORNEYS

INVENTORS
MICHAEL L. DERTOUZOS
HUBER L. GRAHAM
BY Robert F. O'Connell
ATTORNEYS

INVENTORS
MICHAEL L. DERTOUZOS
HUBER L. GRAHAM

BY *Robert F. O'Connell*
ATTORNEYS 3,449,721

GRAPHICAL DISPLAY SYSTEM

Michael L. Dertouzos, Newton, and Huber L. Graham, Cambridge, Mass., assignors to Massachusetts Institute of Technology, Cambridge, Mass., a corporation of Massachusetts Filed Oct. 31, 1966, Ser. No. 590,855
Int. Cl. G11b *13/00*
U.S. Cl. 340—172.5 6 Claims The invention described herein was made in the performance of work under a NASA contract and is subject to the provisions of Section 305 of the National Aeronautics and Space Act of 1958, Pubic Law 85–568 (72 Stat. 435; 42 U.S.C. 2457).

This invention relates generally to display systems and, more particularly, to visual display systems for displaying a contour composed of a plurality of curved portions, each portion having specified initial and final positions, a specified curvature between said positions, and specified initial and final slopes, all of which are controllably generated.

In displaying complex contours, such as alpha-numeric characters or other more generalized curves, on a display device such as a cathode ray oscilloscope tube, it is desirable to utilize computer equipment which will reproduce the desired contour while using a minimum amount of computer time and storage facilities. Previous contour display devices have required relatively complicated encoding and decoding processes and equipments and generally approximate the curved contour in terms of a relatively large number of sequentially displayed straight-line segments. Where even more complicated procedures have been used to generate curved-line segments, such curved segments have been derived from portions of circular waveforms and their use has been very limited since generalized curves rarely consist of portions which are purely circular in shape.

An alternative method for generating an approximation to a complex contour has required the use of relatively small amplitude step-function waveforms. Such approximations require an excessively large number of computer commands which must be embodied in relatively complicated and expensive equipment and which requires a large number of storage registers.

In the display system of this invention, a relatively simple and inexpensive method is used to obtain a very good approximation to a complex contour while requiring relatively few storage facilities and at the same time producing a rapid display with relatively few display commands. The latter characteristic is especially significant when used with on-line computer systems where communication time is slow.

In general, the system of this invention utilizes means for digitally storing the information which specifies the initial and final coordinate positions of each of a plurality of curve portions which make up the complex contour. In addition, information concerning the curvature of each curve portion between such initial and final coordinate points, as well as the initial and final slopes of each of the curve portions is also stored digitally. Specifically, for display on a cathode ray tube, beam-intensity information is also needed to indicate those times when the beam is either in an "on" or an "off" condition.

Once the above command information has been appropriately stored, the overall complex contour is rapidly reproduced by the system of the invention by sequentially reproducing each separate curve portion. In order to reproduce each curve portion the initial and final coordinate position information for that portion is converted from a digital form to an analog to provide an appropriate step-function input signal which is applied to a pair of appropriately chosen networks which generate specified output signals in response to step-function input signals. The output signals of such networks are dependent upon the parameter values of the networks, which parameter values are determined by the remaining digital command information concerning curvature and slopes for the curve portion involved. The output signals from the networks, representing time-varying $x$ and $y$ functions, are then fed to a suitable display device, such as the X and Y input terminals of a cathode ray oscilloscope tube on which the specifically selected curve portion is displayed.

The input step-function and parameter values are then changed appropriately to correspond to those required to reproduce the next selected curve portion so that the outputs of the networks then correspond to the succeeding curve portion which is then displayed on the display device. Successive curve portions are similarly generated until the overall contour has been reproduced.

The details of one preferred embodiment of such network configurations and the application of such parameter control signals to the networks is described more completely with reference to the accompanying drawings wherein.

Figure 1:
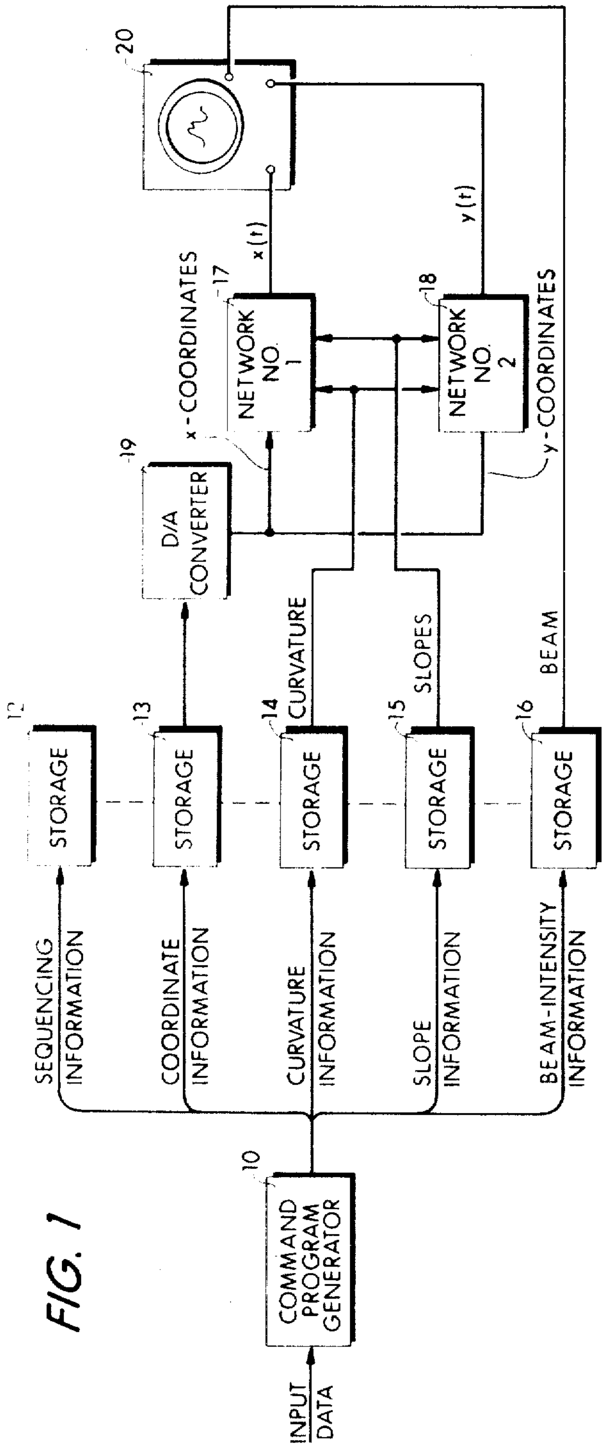
FIG. 1 shows a block diagram of an overall system which uses as a part thereof the display system of the invention.

In order to understand better the display system of the invention it is desirable to consider an overall information and display system which would make use of such an invention. In FIG. 1 there is shown such an overall system for receiving input data and ultimately displaying a curved contour related to such data on a suitable display device. Before such input data is utilized by the display system of the invention, however, a suitable program of commands must be generated and supplied to the display system, as from command program generator 10, for reproducing selected curve portions which are to be sequentially displayed upon the display device and which when so combined reproduce the overall desired contour. The generation of such a command program does not form a part of this invention and, insofar as the operation of the invention is concerned, such a program can be produced by any known techniques. For example, although not limited thereto, the generation of such a command program may be realized through the use of a suitable software program translator which has the capability of accepting input data and producing a suitable command program therefrom. In order to understand how such translator may function in combination with the system of the invention, it is helpful to explain its general operation. Such explanation will be given in subsequent paragraphs and for the time being the discussion of the invention below will assume that a suitable command program has already been generated by program generator 10 using suitably known techniques.

The command program consists of a sequence of commands for sequentially selecting appropriate curve portions to reproduce the desired output curved contour and includes informational commands concerning certain characteristics of each of the curve portions involved. Under the concept of this invention such information includes the initial and final coordination positions of each of such curve portions, the curvature of the curve portion between said coordinate positions, and initial and final slope information for each of the curve portions which are to be used. It is clear that apart from the initially used curve portion, subsequent curve portions will require only information as to the final coordinate point, the curvature and the final slope, since the initial coordinate point and the initial slope of any particular curve portion will correspond to the previously known final coordinate point and final slope, respectively, of the previously selected curve portion. Command information as to the sequence in which such information is to be used must also be suitably generated. As previously indicated, if a cathode ray tube is to be used, information concerning the beam intensity is also generated so that the beam can be appropriately controlled during reproduction of the overall contour.

Once such command information has been generated, it is stored in storage elements 12, 13, 14, 15 and 16 of a suitable computer system so as to be available for use in generating and displaying the selected curve portions involved in appropriate sequence to reproduce the desired overall complex contour. In order to provide for such reproduction the system of the invention utilizes a pair of appropriately selected networks, 17 and 18, having variable and controllable parameters. Such parameters are sequentially controlled by the sequencing, coordinate, curvature and slope command information which has been stored in storage elements 12, 13, 14 and 15. Generally the coordinate information is converted from digital form to analog form through a digital to analog converter 19, while curvature and slope information can be fed to the networks in digital form. The networks then convert such input information into an analog output function in the form of a continuously variable signal, represented by output signals $x(t)$ and $y(t)$ shown in FIG. 1, such signals being fed to the X and Y input terminals of a display device 20, such as a cathode ray tube oscilloscope.

An appropriate sequence of beam-intensity commands is also required to utilize the information stored in element 16 in the correct sequence.

Figure 2B:
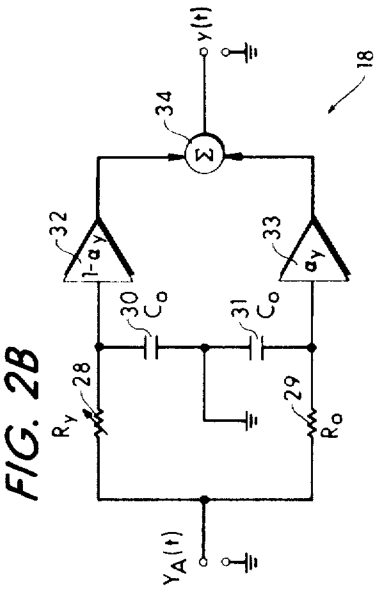
FIG. 2A and FIG. 2B show particular embodiments of the networks of FIG. 1 which can be used to generate the representative curves shown in FIGS. 3A and 3B.
Figure 2A:
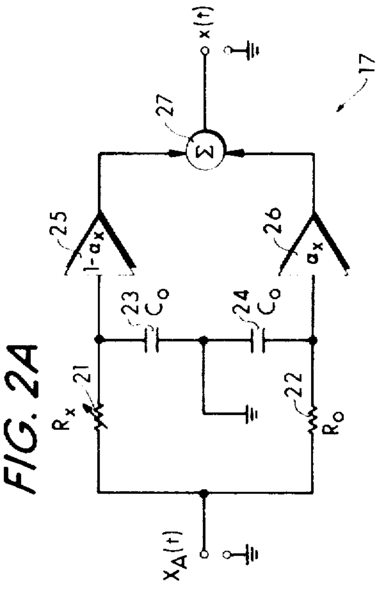

The selection of the particular network configurations shown in FIG. 1 for generating the sequence of desired curve portions in response to such input command is discussed in more detail below with reference to FIGS. 2A and 2B. In such selection it is desirable to choose networks which are capable of producuing a large family of wave forms having different slopes and curvatures in response to step-function inputs. One particular network form which has been found to be useful in the invention is shown in FIGS. 2A and 2B, FIG. 2A representing network 17 and FIG. 2B representing network 18 of FIG. 1. Although the specific networks shown herein have been found satisfactory, other network configurations may be devised for this purpose and the invention is not to be construed as limited to the particular configurations of FIGS. 2A and 2B.

In FIG. 2A an input step-function represents a change in coordinate positions from a first X coordinate point $X_A(t_k)$ (where such symbols represent a general expression for the initial X coordinate value of any curve portion at time, $t_k$), to a second X coordinate point $X_A(t_{k+1})$ (where such symbol represents a general expression for the final X coordinate value of a curve portion at time, $t_{k+1}$). More particularly, the input terminal of the network is connected to a variable resistor 2 and a fixed resistor 22, the other ends of which are connected to one side of capacitors 23 and 24, respectively. The other side of such capacitors are connected to ground so that a pair of parallel connected R–C (resistor-capacitor) networks 21, 23 and 22, 24, respectively, are thereby formed. The output end of variable resistor 21 (i.e., the output of R–C network 21, 23) is connected to a multiplier amplifier 25 having a gain represented by the value $(1-\alpha_x)$. The meaning of $\alpha$ will become clear in the more detailed discussion below of the network response. The output end of fixed resistor 22 (i.e., the output of R–C network 22, 24) is connected to a multiplier amplifier 26 having a gain represented by the value $\alpha_x$ and the outputs of amplifiers 25 and 26 are added in summation network 27 to produce a time varying output signal represented as $x(t)$.

FIG. 2B shows a similar network associated with a time varying output signal represented as $y(t)$. In that network, variable resistor 28, fixed resistor 29, capacitor 30, capacitor 31, multiplier amplifiers 32 and 33 (with appropriate gains of $(1-\alpha_y)$ and $\alpha_y$, respectively) and summation network 34 are connected in a similar configuration to that of FIG. 2A and are fed with an input step-function signal representing a change from initial Y coordinate $Y_A(t_k)$ to final Y coordinate $Y_A(t_{k+1})$.

In such networks the following conditions are applied:

$$R_xC_0 \leq R_0C_0$$
$$R_yC_0 \leq R_0C_0$$

The output signals, $x(t)$ and $y(t)$, of such networks can be expressed as the following exponential functions in response to a unit step-function input:

$$x(t)=[1-(\alpha_x e^{-\sigma_0 t}+(1-\alpha_x)e^{-\sigma_x t})]u_{-1}(t) \quad (1)$$

$$y(t)=[1-(\alpha_y e^{-\sigma_0 t}+(1-\alpha_y)e^{-\sigma_y t})]u_{-1}(t) \quad (2)$$

where $\alpha_x$ and $\alpha_y$ are appropriate coefficient values, $\sigma_x$ and $\sigma_y$ represent network natural frequencies and are positive, and $u_{-1}(t)$ represents a unit step-function.

The following constraints are applied to such configurations:

$$0 \leq \alpha_x \leq 1$$
$$0 \leq \alpha_y \leq 1$$
$$\alpha_x < 1 => \alpha_y = 1$$
$$\alpha_y < 1 => \alpha_x = 1$$
$$\sigma_x > \sigma_0$$
$$\sigma_y > \sigma_0$$

Under such constraints the resulting trajectory from an initial coordinate position represented by coordinates $(X_0, Y_0)$ to a final coordinate position represented by $(X_1, Y_1)$ is of the form expressed by the following two equations:

$$y=Y_1+(Y_0-Y_1)\left[\frac{\alpha_y(x-X_1)}{X_0-X_1}+(1-\alpha_y)\left(\frac{x-X_1}{X_0-X_1}\right)^{\frac{\sigma_y}{\sigma_0}}\right]$$

for $\alpha_x = 1$
$\alpha_y \leq 1$
(3)

$$x=X_1+(X_0-X_1)\left[\frac{\alpha_x(y-Y_1)}{Y_0-Y_1}+(1-\alpha_x)\left(\frac{y-Y_1}{Y-Y_1}\right)^{\frac{\sigma_x}{\sigma_0}}\right)$$

for $\alpha_y = 1$
$\alpha_x \leq 1$
(4)

Figure 3B:
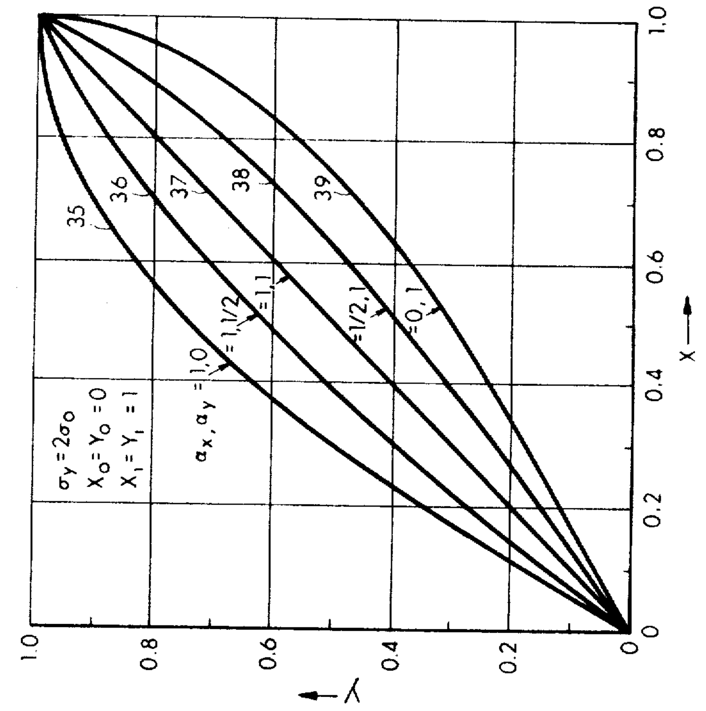
FIG. 3A and FIG. 3B show representative curve portions generated by specifically chosen networks useful in the system of FIG. 1.
Figure 3A:
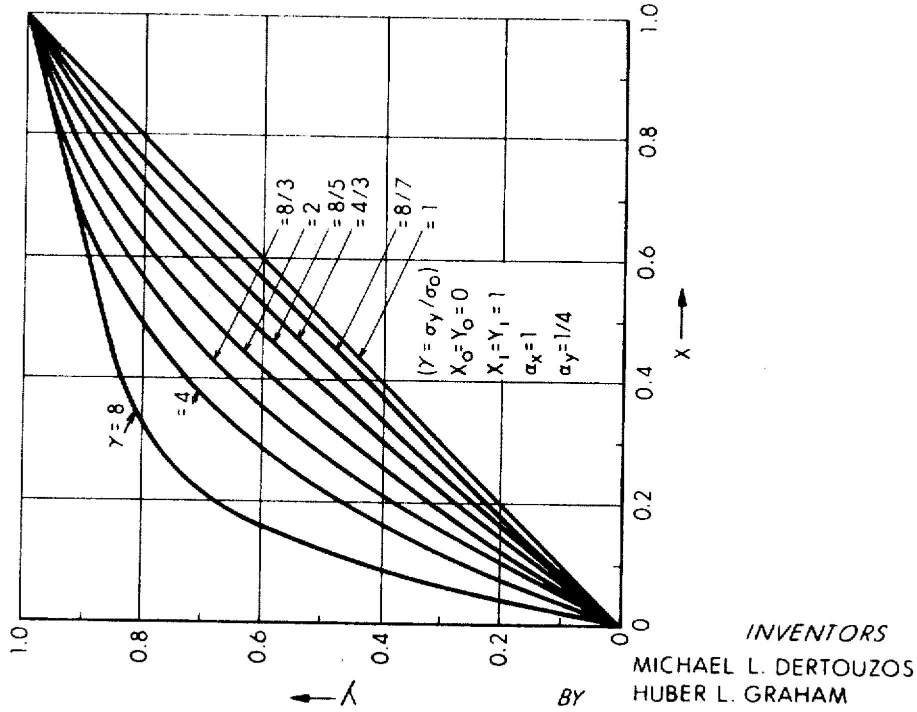

Typical members of the class of curves represented by Equations 3 and 4 are shown in FIGS. 3A and 3B. Such curves obviously represent only a few examples of the family of curves capable of generation by Eqs. 3 and 4 through appropriate variations of $\alpha_x$, $\alpha_y$, $\sigma_x$, $\sigma_y$. In FIG. 3A, $\alpha_x$ is made equal to unit, $\alpha_y$ is made equal to 0.25, and the ratio $\gamma_y$ (equal to $\sigma_y/\sigma_0$) has various values from 1 to 8, as shown. In accordance with Eq. 3 the curves shown in FIG. 3A result from such conditions.

In FIG. 3B the ratio $\gamma_y$ (equal to $\sigma_y/\sigma_0$) is fixed at a value equal to 2. For curves 35, 36, and 37 $\alpha_x$ is fixed at unity and $\alpha_y$ is varied between 0 and 1 in accordance with Eq. 3. When $\alpha_y$ is made equal to unity and $\alpha_x$ is varied from 0 to 1, curves 38 and 39 result from the application of the Eq. 4, where $\gamma_x$ (equal to $\sigma_x/\sigma_0$) is equal to 2. From Equations 3 and 4 then, it is clear that the final slope, $m_f$, of any such curve portion can be expressed as:

$$m_f=\begin{cases}\alpha_y\dfrac{(Y_0-Y_1)}{X_0-X_1} & \text{for } \alpha_x=1,\ \alpha_y\leq 1\\[2ex] \dfrac{1}{\alpha_x}\dfrac{(Y_0-Y_1)}{X_0-X_1} & \text{for } \alpha_y=1,\ \alpha_x\leq 1\end{cases}\quad (5)$$

The final $\alpha_x$ or $\alpha_y$ and by the initial and final coordinate values (in this case $X_0$, $Y_0$ and $X_1$, $Y_1$), the parameters $\gamma_x$ or $\gamma_y$ not being involved in the determination of such slope. A large family of curves having a particular selected final slope can be obtained by fixing the initial and coordinate positions and the coefficient values $\alpha_x$ and $\alpha_y$, while simultaneously varying the ratio $\gamma_y$, for example (or a similar family can be generated by varying the ratio, $\gamma_x$).

The ratios $\gamma_x$ and $\gamma_y$ can be varied in the networks of FIGS. 2A and 2B by appropriately varying resistors 21 and 28 which clearly vary the time constants (or natural frequencies) of the networks involved. The gain values of amplifiers 25, 26, 32 and 33 are selected in accordance with the coefficient values $\alpha_x$ and $\alpha_y$. The initial and final coordinate positions determine the input step-function to the network. Thus, by specifying the coordinates $X_A(t_k)$, $Y_A(t_k)$ and $X_A(t_{k+1})$, $Y_A(t_{k+1})$, the values of resistors 21 and 28 and the gains of amplifiers 25, 26, 32, and 33, a selected curve portion can be obtained from networks 17 and 18 for display on a display device 20 of FIG. 1. A sequential specification of different sets of such values produces a sequence of curves so that an overall contour can be appropriately displayed.

Figures 4, 5:
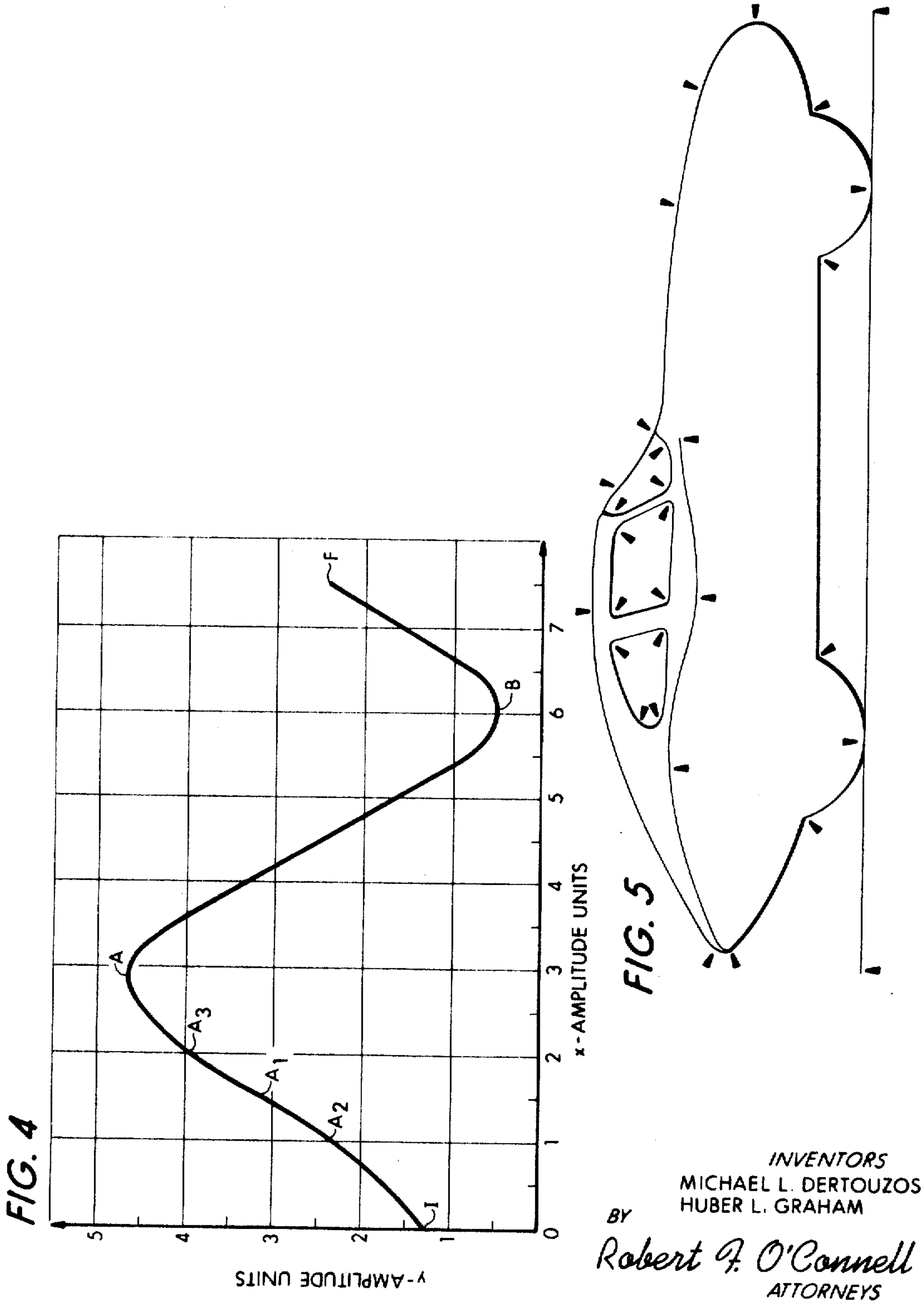
FIG. 4 shows a graphical plot of a sample contour used to explain the operation of a portion of the overall system shown in FIG. 1.
FIG. 5 shows a sample contour which has been reproduced by the system of the invention.

It is now helpful to discuss the operation of one type of command program generator, such as a software program translator mentioned above, which, although not forming a part of this invention, can be used to generate the necessary coordinate, curvature and slope command information for the display system of the invention utilized in setting the parameters of networks 17 and 18. In order to describe the operation and function of an appropriate translator it is desirable to select a simple example which will indicate the type of programming methods which may be used to produce an appropriate sequence of commands. Let us assume that a contour, such as shown in FIG. 4, is desired to be reproduced. Such a continuous curve may be reproduced approximately by previously known systems, for example, by a plurality of interconnected straight short-line segments requiring an appropriate and usually relatively large number of commands depending on the degree of accuracy desired.

Utilizing the system of this invention, however, the number of commands required to reproduce such a curve can be reduced considerably by selecting a lesser number of appropriate curve portions to fit the curve shown in FIG. 4 within the same desired limits of accuracy.

For example, the translator may be programmed to conduct a search for those particular curve portions within the realizable family of curves available from networks 17 and 18 which can be used to match successive curve portions of the overall contour within the acceptable error requirements. A program for making such a search as required by the translator can be readily worked out by utilizing conventionally known binary-search techniques. The translator operation for generating a suitable command program is, thus, within the scope of those skilled in the art.

For one such search program the translator 10 initially may be programmed, for example, to locate all the local maxima and minima points on the overall contour as well as the initial and final coordinate positions of the overall curve. The initial point I and the final point F are shown in FIG. 4 and intermediate maximum and minimum points A and B are also shown thereon. This search should be programmed to produce the smallest number of curve portions that will match the overall curve between successive maximum and/or minimum points. For example, consider the segment of the contour shown in FIG. 4 from initial point I to first maximum point A. A search is initially made within the realizable family of curves to determine which, if any, of such curves can be used to match that portion of the overall contour within the specified maximum error.

If, on the one hand, none can be found, a new point $A_1$, half the distance from I to A, is selected to determine whether a realizable curve can be found to match the shorter curve portion from I to $A_1$. If no realizable curve can be found for the segment I–$A_1$, another new point, $A_2$, is selected at half the distance from I to $A_1$ and a similar search is made. Such process is repeated until a realizable curve can be found from I to some point between I and $A_1$. If, on the other hand, it was initially possible to match the segment I–$A_1$, a new point, $A_3$, is selected midway between $A_1$ and A and a search is made for a curve to match the segment I–$A_3$. Again such process is repeated until a realizable curve can be found from I to some point between $A_1$ and A. In either case, the process, which is repeated until it terminates, yields the longest portion of the curve, starting at point I, that can be generated by the networks 17 and 18 within the maximum specified error limits.

The program is then repeated for the next curve portion. For example, if a successful match has been found between I and $A_3$, a search is made for a successful match between $A_3$ and A and so on until the entire contour is matched. In such a repetitive process it is necessary that the minimum number of curve portions be selected for the overall contour. Therefore, the search program should be set up to avoid choosing a curve portion which will fit the desired curve to a greater degree of accuracy than is needed under the maximum specified limits thereof. For example, if it were possible to select a curve portion (let us say the segment from I to $A_1$) which will fit the desired curve to within half the maximum required accuracy requirements, it is desirable that the search program continue until the longest curve segment meeting the accuracy requirements is found (e.g., between points I and $A_3$). Thus, a desirable fit can be achieved for the maximum specified accuracy requirement to assure the minimum total number of curve portions.

Once appropriate curve portions have been selected from the family of realizable curve portions capable of being generated by networks 17 and 18, the characteristics of such curve portions are readily identified by the translator. Such characteristics include the initial and final coordinate points, the curvature therebetween, and the initial and final slopes thereof. As indicated previously, apart from theinitial curve portion it is only necessary that the storage facilities of the computer store program information with respect to the final coordinate point, the final slope, and the curvature of each curve portion, such information being coupled with the previously known final coordinate point and final slope information of the preceding curve to adequately determine the particular curve portion which is to be reproduced.

It has been found that in using the system of the invention in which portion of the overall contour are reproduced from a family of known, realizable curves, the number of computer commands required (and, hence, the time for reproducing the overall contour) is reduced considerably. For example, the curve shown in FIG. 4 may be reproduced within reasonable accuracy requirements with fewer curve portions (requiring the storage of fewer sets of commands) than the number of straight line segments required by other known techniques.

In summary, then, once a given contour is known, information for approximating portions of the contour by a sequence of known members of a realizable family of curves can be obtained by known techniques in order to generate a series of sequential commands which can be appropriately stored. Such commands are then used in the system of the invention to change sequentially the parameters of an appropriately chosen pair of networks so as to provide analog output signals which are applied to an appropriate display device. While some computational effort is necessary for generating the required command program, substantially few storage elements are required to store such commands and the overall contour can be displayed in a relatively fast time. As mentioned above, in on-line computer systems, especially those which are to be time shared by many users, such storage and fast display times are highly advantageous. In short, by this invention a fewer number of commands can be utilized to reproduce a highly complex curve than in previously known systems.

While other network configurations can be used for networks 17 and 18, the ones shown represent one readily useful embodiment for generating a large family of realizable curves for fitting contours of substantial complexity. A further comparison of the improvement brought about by this invention with regard to the required amount of command information necessary to reproduce a complex contour can be shown with reference to FIG. 5, wherein the system of this invention has been able to reproduce the automobile silouette shown herein by utilizing 30 curve segments (and, appropriately, fewer than 100 sets of commands). This number of segments can be contrasted with the use of several hundred points which would be necessary for a piece-wise linear approximation by a point-by-point plot of the same drawing.

Clearly, the type of display discussed in this invention should be most advantageous in cases where standard parts, or curve portions, are repeatedly used. In such cases, the commands required to reproduce such portions need only be produced once and can be repeatedly used so that the necessity for regenerating such commands is removed. The system of the invention has also proven useful even in cases where a particular curve has required reproduction only once. The advantage of having a visual display of analyzed data in a typical display time interval of a few seconds, as compared with the necessity for conventional display time of several minutes to reproduce the same curve on point-by-point basis, is obvious with respect to on-line computer systems. In addition, accuracies can be made comparable to those achieved by linear segmentation.

Although the system of the invention utilizing the specific network configurations of FIGS. 2A and 2B can provide successful operation thereof the invention is not limited to those particular networks. Other networks which provide a large family of realizable curves adequate to reproduce complex contours will occur to those skilled in the art. Hence, the invention is not to be construed as limited to the particular embodiment shown and described herein except as defined by the appended claims.

What is claimed is:

1. A system for displaying a contour composed of a plurality of curve portions comprising:

means for storing information specifying sequentially the initial and final positions of each of said curve portions, the curvature of each of said curve portions between said initial and final positions and the slopes of each of said curve portions at said initial and final positions;

network means having a plurality of variable parameters responsive to said position, curvature, and slope information for producing a plurality of output signals representative of each of said curve portions; and means responsive to said output signals for sequentially displaying said curve portions thereby displaying a reproduction of said contour.

2. A system for visually displaying a contour composed of a plurality of curve portions comprising:

means for digitally storing command information specifying sequentially the initial and final positions of each of said curve portions, the curvature of each of said curve portions between said initial and final positions and the slope of each of said curve portions at said initial and final positions;

means for converting said position information from digital to analog form;

a pair of network means being responsive to said analog position information and having a plurality of variable parameters responsive to said curvature and slope information for producing a pair of analog output signals;

means responsive to said analog output signals for visually and sequentially displaying said curve portions thereby providing a visual reproduction of said contour.

3. A system in accordance with claim 2 wherein said visual display means is a cathode ray tube.

4. A system in accordance with claim 3 wherein such system also includes means for storing information for controlling the beam-intensity of the electron beam utilized in said cathode ray tube.

5. A system in accordance with claim 4 wherein each of said pair of networks includes a pair of amplifiers, the gains of which are responsive to said slope information.

6. A system in accordance with claim 4 wherein each of said pair of networks includes a pair of resistor-capacitor circuits, at least one of said circuits including a variable resistor, the resistance value of which is responsive to said curvature information.

References Cited

UNITED STATES PATENTS

| | | | |
|---|---|---|---|
| 3,205,344 | 9/1965 | Taylor et al. | 340—324 X |
| 3,335,315 | 8/1967 | Moore | 315—18 |
| 3,335,416 | 8/1967 | Hughes | 340—324 |
| 3,364,382 | 1/1968 | Harrison | 315—18 |

OTHER REFERENCES

Generating Characters by Perry and Aho in "Electronics" Jan. 3, 1958 edition, pp. 72–75.

IBM Graphic Display System by Houldin in "Information Display" September/October 1966 edition, pp. 34–40.

PAUL J. HENON, *Primary Examiner.*

P. R. WOOD, *Assistant Examiner.*

U.S. Cl. X.R.

340—324